US 6,687,067 B2

United States Patent
Brianti et al.

(10) Patent No.: US 6,687,067 B2
(45) Date of Patent: Feb. 3, 2004

(54) PERPENDICULAR SIGNAL EQUALIZATION AND TIMING RECOVERY USING HILBERT TRANSFORM

(75) Inventors: Francesco Brianti, San Jose, CA (US); Bertrand Gabillard, Paris (FR); Martin Aureliano Hassner, Palo Alto, CA (US); Manfred Ernst Schabes, San Jose, CA (US); Yoshiaki Sonobe, San Jose, CA (US); Barry Marshall Trager, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 09/802,636

(22) Filed: Mar. 9, 2001

(65) Prior Publication Data

US 2002/0126406 A1 Sep. 12, 2002

(51) Int. Cl.$^7$ ................................................ G11B 5/09
(52) U.S. Cl. ........................... 360/46; 360/67; 360/65; 360/69
(58) Field of Search ........................... 360/46, 69, 65; 708/819, 820; 326/52

(56) References Cited

U.S. PATENT DOCUMENTS

| | | | | |
|---|---|---|---|---|
| 5,444,578 A | * | 8/1995 | Terazawa | 360/65 |
| 6,424,172 B1 | * | 7/2002 | Pisati et al. | 326/48 |
| 2001/0037353 A1 | * | 11/2001 | Pisati et al. | 708/819 |

OTHER PUBLICATIONS

Langland B. J., Processing of Signals from Media with Perpendicular Magnetic Anisotropy, Sep. 1980, IEEE Transactions on Magnetics, vol. MAG–16 No. 5, pp. 640–642.*

Langland B. J., Phase Equalization for Perpendicular Recording, Nov. 1982, IEEE Transactions on Magnetics, vol. MAG–18 No. 6, pp. 1247–1249.*

IEEE International Symposium on Circuits and Systems, Tseng et al. "Design of Discrete–Time Fractional Hilbert Transformer", May 28–3, 2000. pp. V–525–V–528.*

IEEE International Conference on Acoustics, Speech, and Signal Processing, Kumaresan, "An Inverse Signal Approach to Computing the Envelope of a Real Valued Signal", Mar. 15–19, 1999. pp. 1349–1352.*

IEEE Transactions on Instrumentation and Measurement, Fritsch et al. "A Digital Envelope Detection Filter for Real–Time Operation", Dec. 1999. vol. 48, No. 6 pp. 1287–1293.*

IEEE Signal Processing letters, Rao et al. "A Parametric Modeling Approach to Hilbert Transformation", Jan. 1998. pp. 15–17.*

* cited by examiner

*Primary Examiner*—David Hudspeth
*Assistant Examiner*—Natalia Figueroa
(74) *Attorney, Agent, or Firm*—John L. Rogitz (57) ABSTRACT

A Hilbert transform is used to process perpendicular magnetic recording signals from both single layer and dual layer disks to produce a complex analytic signal. This complex analytic signal is used to derive angles of magnetization, which depend on the distance between recorded magnetic transitions and consequently which can be used in error estimation. Moreover, the Hilbert transform in cooperation with an equalizer FIR optimizes transformation of the signal such that conventional longitudinal recording processing methods can subsequently be used to process the signal that is read back from the magnetic recording medium.

8 Claims, 9 Drawing Sheets

FIG. 1

FIG. 1A - RLL CODE] TRANSLATES
IF QUANTIZER [FOR (1,7)
MAG. ANGLE VARIATIONS INTO ZERO RUN LENGTH ESTIMATES

FIG. 11

PERPENDICULAR SIGNAL EQUALIZATION AND TIMING RECOVERY USING HILBERT TRANSFORM

BACKGROUND OF THE INVENTION

1. Field of the Invention

The present invention relates generally to perpendicular recording of data onto magnetic recording disks.

2. Description of the Related Art

In data recording devices such as magnetic disk drives and tape drives, MR and GMR heads are used to read data that has been recorded on the devices. These heads detect magnetic transitions on the storage medium that have been previously established ("written") on the medium to represent data. The output voltage waveform of the head represents the transition locations and, thus, the data on the medium.

The magnetic transitions can be thought of as vectors, and in conventional magnetic recording, the direction of each magnetic transition vector, i.e., the angle of magnetization, is parallel to the recording track. This is also referred to as "longitudinal" recording. More recently, perpendicular recording has been proposed, wherein the angle of magnetization is more or less perpendicular to the recording track. Actually, the present invention recognizes that the angle of magnetization deviates from the true perpendicular by an amount that depends on the distance between magnetic transitions. In any case, one advantage of perpendicular recording over longitudinal recording is that perpendicularly-recorded disks are more thermally stable than longitudinally-recorded disks.

As recognized herein, however, much work over the years has been spent on developing read signal processing that assumes longitudinal recording. Accordingly, the present invention recognizes that it would be advantageous to provide a way to process perpendicular magnetic transition signals in a manner that could exploit the well-developed technology in longitudinal recording read channels. Moreover, the present invention recognizes that timing recovery information can be extracted from the instantaneous phase/frequency of the complex analytic signal obtained by means of a Hilbert transform of the perpendicular readback signal.

SUMMARY OF THE INVENTION

A magnetic data read device for processing signals from a perpendicularly-recorded magnetic storage medium includes at least one Hilbert transform that receives signals from the magnetic storage medium. In a preferred embodiment, a read channel cooperates with the Hilbert transform. The Hilbert transform can be between the read channel and the storage medium, or it can be located in the read channel, before or after the ADC of the read channel.

One preferred Hilbert transform can be established by a finite impulse response (FIR) having plural taps. For instance, the FIR can have at least five taps, and indeed can have seven taps. In any case, the signals received from the storage medium are perpendicular signals, the read channel includes at least one equalizer, and the Hilbert transform cooperates with the equalizer to transform the perpendicular signals to longitudinal signals.

In another aspect, a computer program device includes a computer readable medium having a program of instructions thereon for processing data associated with a magnetic recording medium. The program of instructions includes logic means for determining a magnetization angle from a complex analytic signal established by combining a Hilbert transformation of a magnetic recording read signal with the read signal.

In still another aspect, a method is disclosed for determining an angle of magnetization on a perpendicular recording medium. The method includes receiving a signal from the medium, and deriving a Hilbert transform of the signal. The Hilbert transform of the signal is combined with the signal to render a complex analytic signal.

In another aspect, a method for determining an angle of magnetization on a perpendicular recording medium includes receiving a signal from the medium, deriving a Hilbert transform of the signal, and, using the Hilbert signal, deriving the angle of magnetization.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
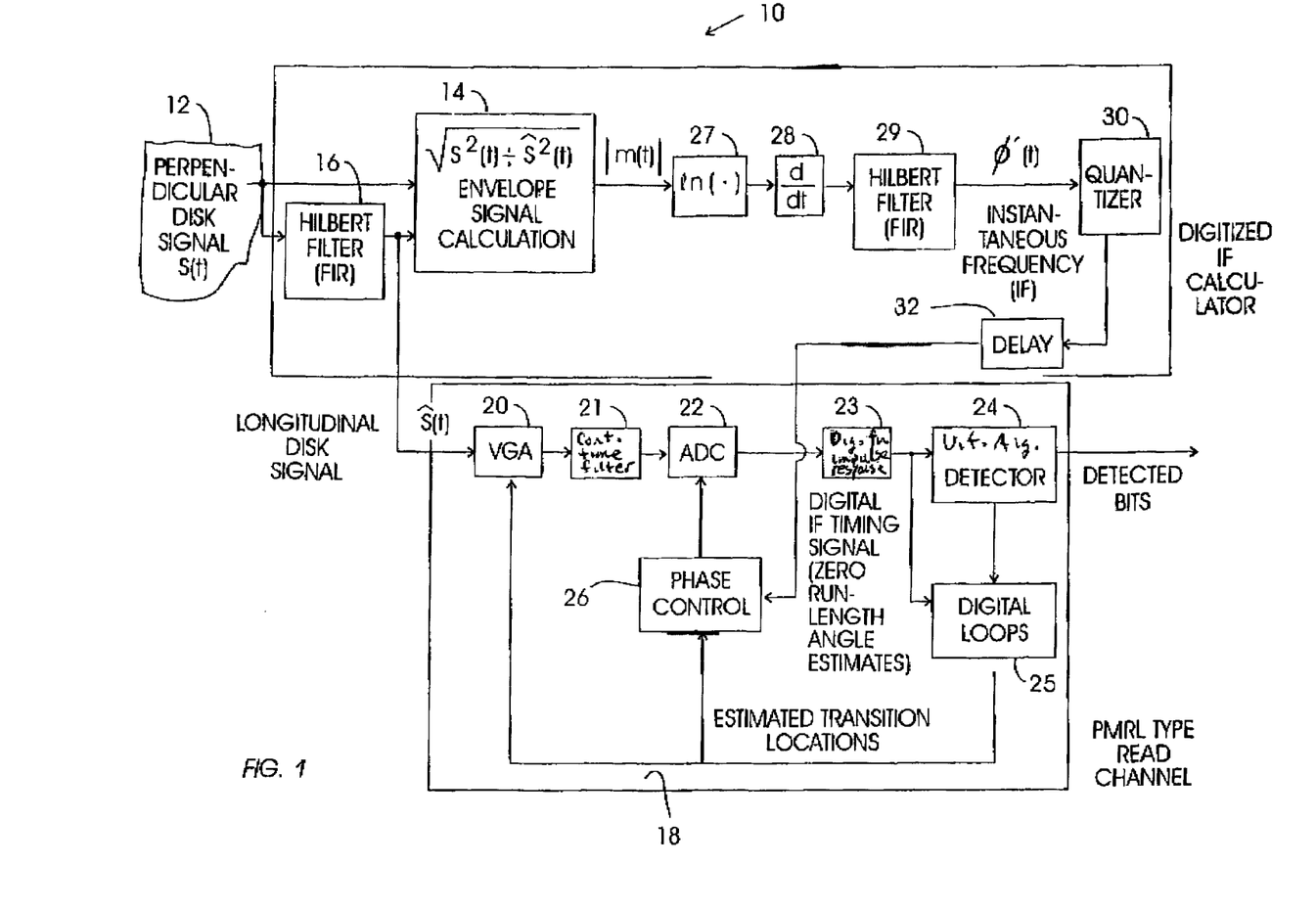
FIG. 1 is a block diagram of a first embodiment of the present system.

Referring initially to FIG. 1, a magnetic recording readback system is shown, generally designated 10, for processing signals represented by magnetic transitions on a magnetic storage or recording medium 12. It is to be understood that the medium 12 can be a magnetic disk of a hard disk drive, although other recording media, such as magnetic tape, floppy diskette, and so on can be used.

In the architecture shown in FIG. 1, the signal (designated S(t)) from the medium 12 is sent to an envelope calculator 14 which, in accordance with the logic of FIG. 7 below, combines the signal with a transform thereof (designated S(t)) to render an envelope magnitude signal. The Hilbert transform is generated by a main Hilbert transform 16 as shown, which also receives the perpendicular signal from the disk. A preferred implementation of the main Hilbert transform 16 is described further below in reference to FIG. 4.

In effect, the output of the main Hilbert transform 16 represents the readback that would be expected from a parallel (or longitudinal)-recorded disk, and it is sent to a conventional read channel 18. While all conventional read channels are contemplated herein, the exemplary read channel 18 includes in series, in accordance with principles known in the art, a variable gain amplifier (VGA) 20, a continuous time filter (CTF) 21, an analog to digital converter (ADC) 22 and a digital finite impulse response (FIR) equalizer 23. Thus, the Hilbert transform 16 cooperates with the equalizer to transform the perpendicular signals to longitudinal signals. From the DFIR 23 the signal is sent to a VA detector 24 which outputs the detected bits from the disk. The VA detector 24 and DFIR 23 also send their outputs to digital loops 25 which, in accordance with longitudinal read channel principles known in the art, output a signal to the VGA 20 to provide timing and amplitude control. Moreover, the loops 25 output a signal representing estimated transition locations to a phase and frequency control module 26, which in turn outputs a control signal to the ADC 22.

Having described the read channel 18, attention is now directed to upper portion of FIG. 1. As shown, the envelope calculator 14 sends its output to a logarithm generator 27, which generates a logarithm of the signal that can be differentiated with respect to time by a differentiator 28. A second Hilbert filter 29 receives the output of the differentiator 28 and outputs a signal representative of the angle of magnetization (or its time-based derivative, when the differentiator 28 is used). The signal is then processed through a quantizer 30 to limit the peaks of the signal, and then the signal is sent to a delay 31 that adjusts for differences in processing times between the read channel 18 and the upper portion of the circuit that derives the magnetization angle. The magnetization angle (or its derivative) is then sent to the phase/frequency control module 26, for timing recovery purposes set forth further below. It is to be understood that the structure described in this paragraph can be implemented in hardware or software, and that in any case it functions in accordance with FIG. 7 below.

Figure 1A:
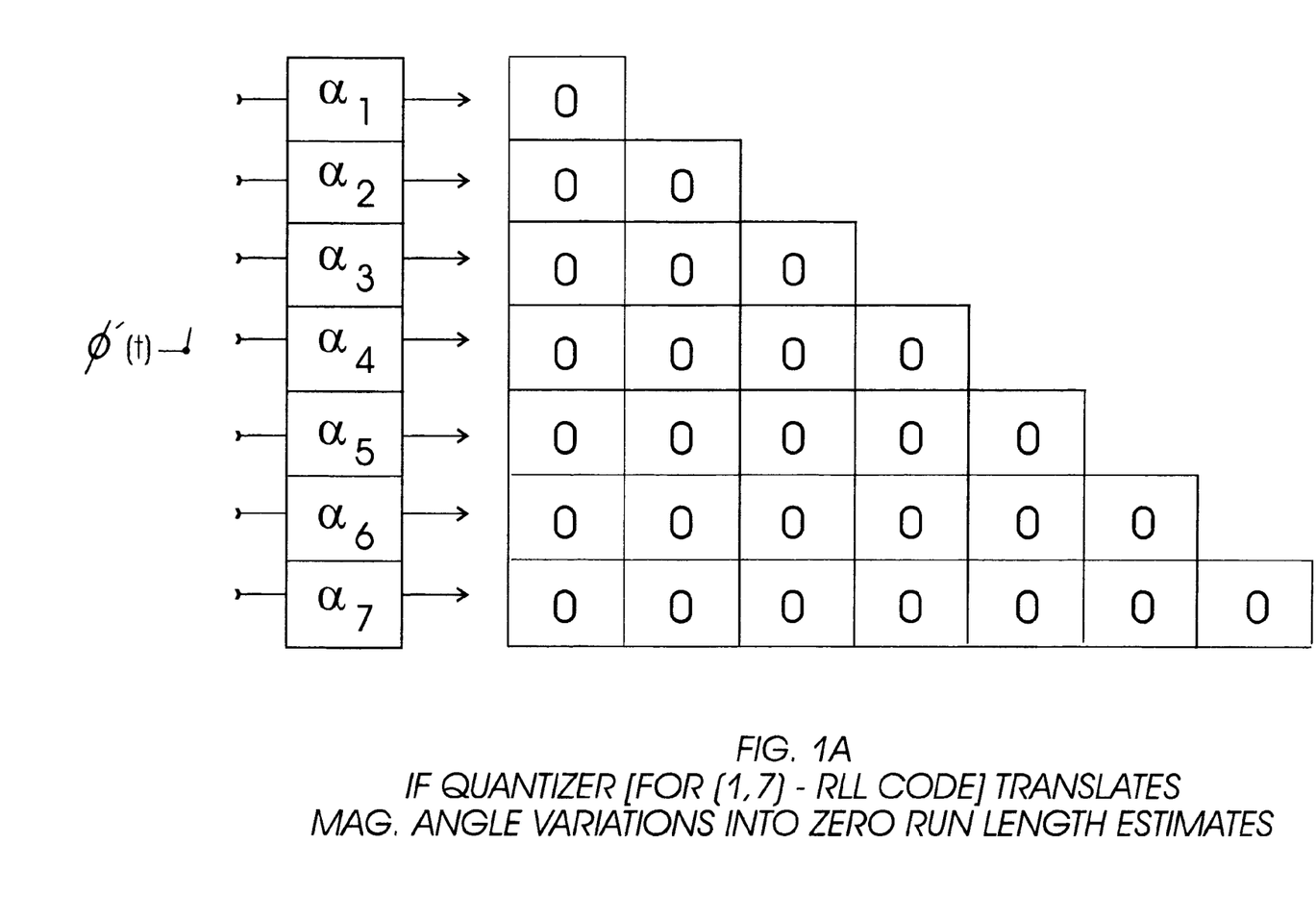
FIG. 1A shows an IF quantizer for the (1,7) code for translating the magnetic angle variations into zero run length estimates.
Figure 2:
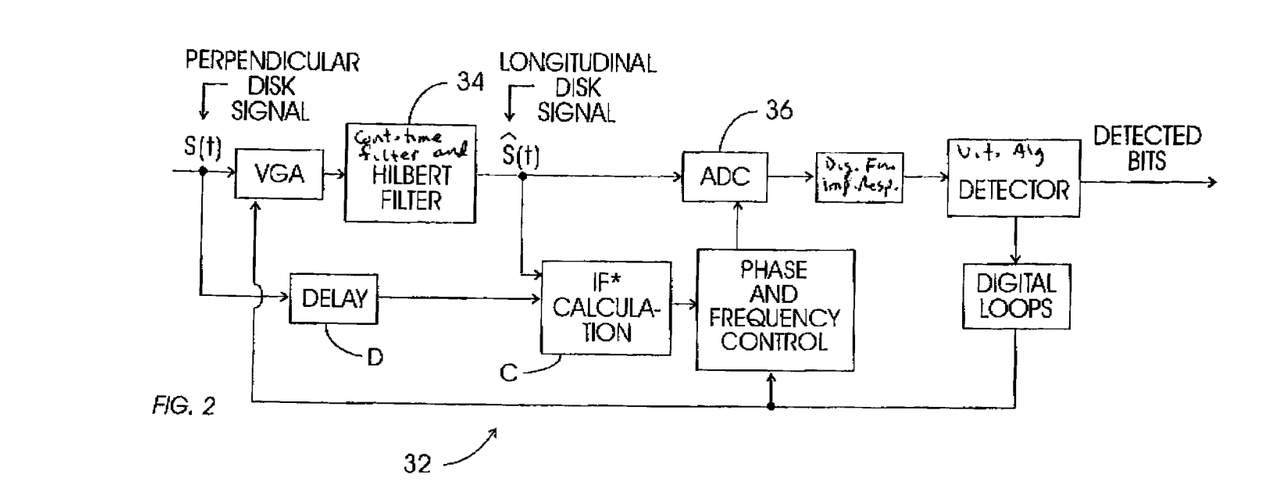
FIG. 2 is a block diagram of a second embodiment of the present system.
Figure 3:
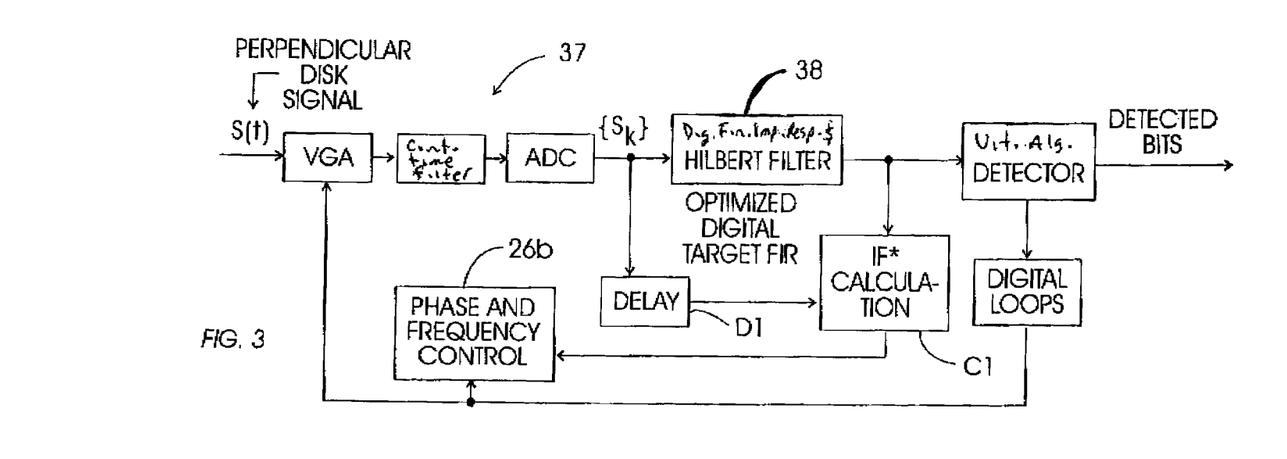
FIG. 3 is a block diagram of a third embodiment of the present system.

In the embodiment shown in FIG. 1, the main Hilbert transform filter of the present invention is located outside the read channel, and specifically between the read channel and the medium 12. FIGS. 2 and 3 show that alternatively, the main Hilbert transform filter of the present invention can be implemented within the read channel, both before (FIG. 2) and after (FIG. 3) the present ADC. More particularly, in FIG. 2 a system 32 is shown that contemplates sending the signal from the data storage medium through the VGA to a combined CTF/Hilbert transform 34, and thence to an ADC 36. A delay "D" delays the signal from the disk and sends it to an instantaneous frequency (IF) calculator "C", which combines it with the transformed main signal from the combined CTF/Hilbert transform 34 and which outputs a signal to a phase/frequency control module 26a. The digitized IF calculator shown in the upper portion of FIG. 1 is thus incorporated in the architecture shown in FIG. 2. The system 32 is in all other essential respects identical to that shown in FIG. 1. FIG. 1A shows an exemplary IF quantizer for the (1,7) code for translating the magnetic angle variations into zero run length estimates.

On the other hand, FIG. 3 shows a system 37 wherein the signal from the medium is first digitized before being sent to a combined DFIR/Hilbert filter 38. IF calculation is done by sending the non-transformed, digitized signal to a delay "D1" which delays the signal from the disk and sends it to an IF calculator "C1", which combines it with the transformed main signal from the combined DFIR/Hilbert filter 38 and which outputs a signal to a phase/frequency control module 26b. The digitized IF calculator shown in the upper portion of FIG. 1 is thus incorporated in the architecture shown in FIG. 2. The system 37 is in all other essential respects identical to that shown in FIG. 1.

Figure 4:
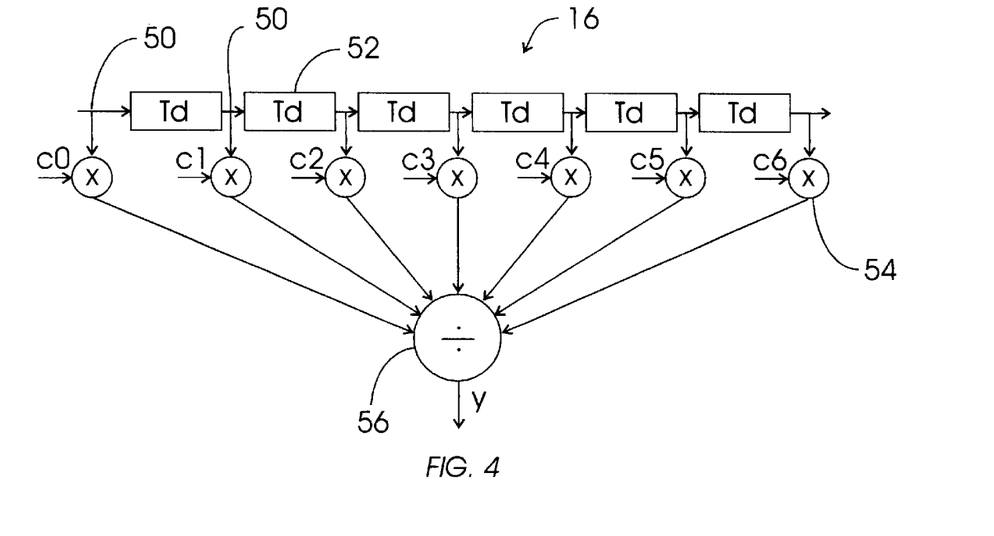
FIG. 4 is a schematic diagram of the presently preferred Hilbert transform.

FIG. 4 shows the presently preferred Hilbert transform 16, which is implemented as a FIR with plural taps 50 staggered between plural delays 52. In one non-limiting embodiment, the Hilbert transform has at least five taps 50 and in the embodiment shown in FIG. 4 it has seven taps 50 and six delays 52. Each tap 50 leads to a respective multiplier 54, which multiplies the signal in the tap by a constant in accordance with FIR principles known in the art. The signals from the taps 50 are added together, after multiplication, by an adder 56, which outputs the Hilbert-transformed signal (labelled "y" in FIG. 4). In a particularly preferred, non-limiting embodiment, the programmable delays 52 can be implemented by movable pole low pass filters, and more specifically each delay 52 can be implemented by two differential amplifiers connected as a single follower. The programmable delay Hilbert filter can accommodate a specified range of write frequencies.

Figure 5:
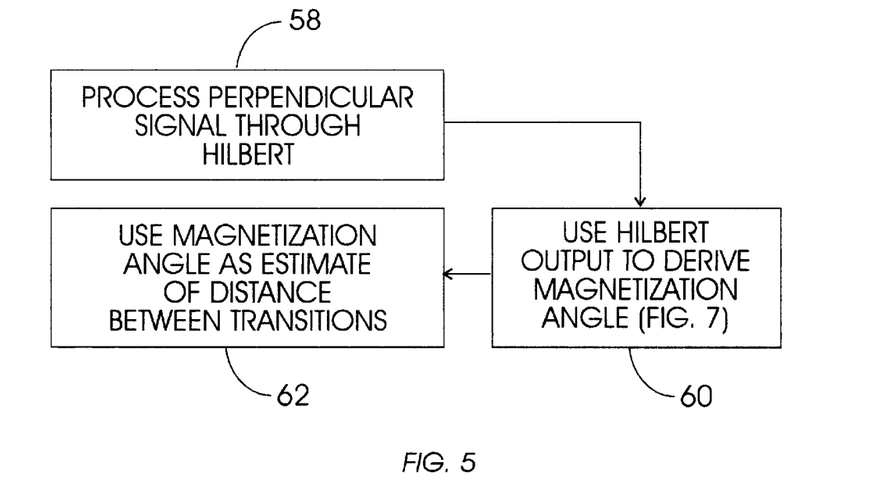
FIG. 5 is a flow chart showing the overall logic of the present invention.

Now referring to FIG. 5, the overall logic of the present invention can be seen. Commencing at block 58, the signal representing perpendicularly-recorded magnetic transitions is sent through the main Hilbert transform as described above. At block 60, the output of the Hilbert transform 29 is used to derive a magnetization angle. One preferred way to do this is shown in FIG. 7, discussed further below. Then, at block 62 the magnetization angle can be used as an estimate of the distance between magnetic transitions and, hence, as a timing recovery error check.

Figures 6, 7:
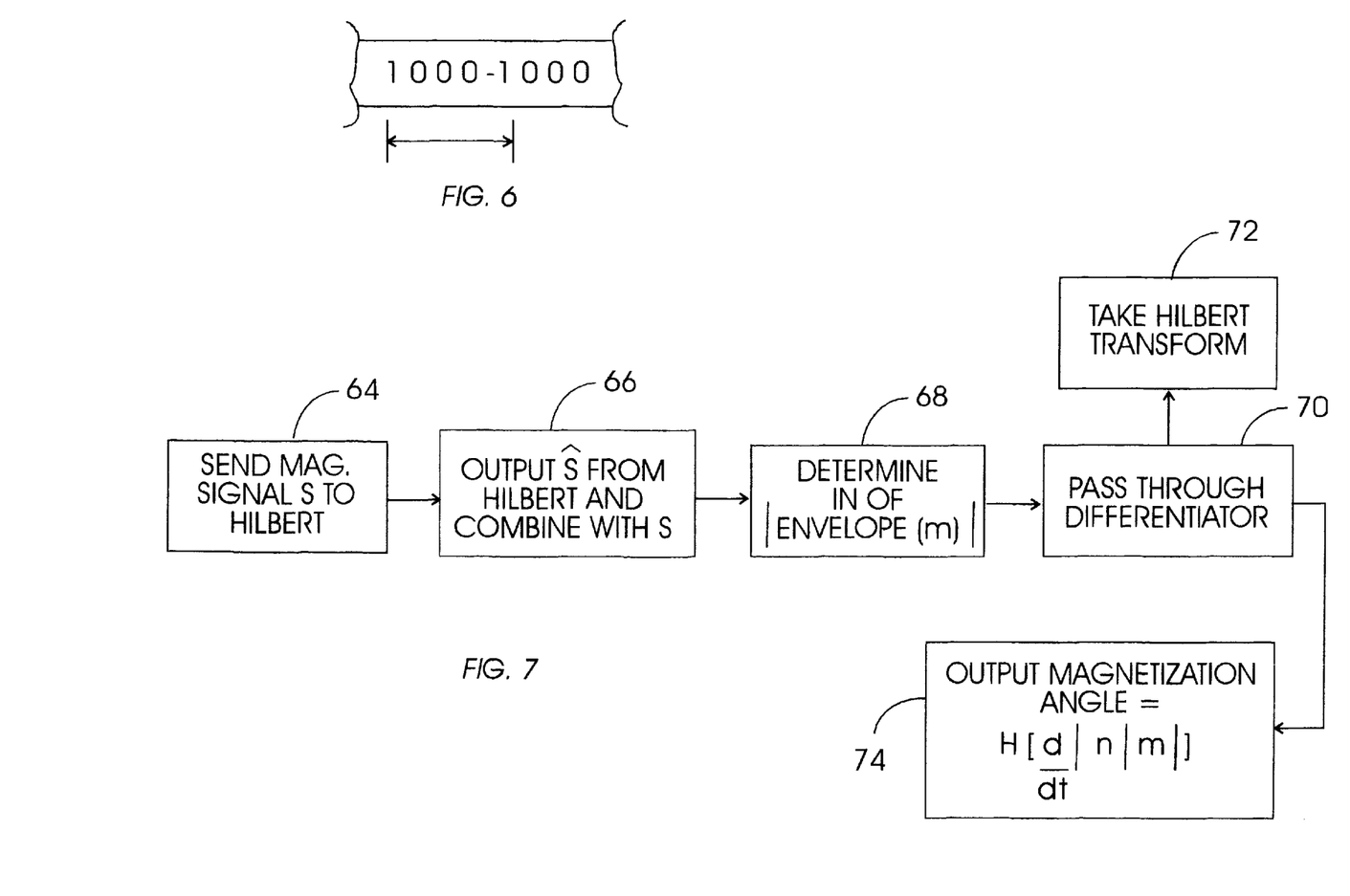
FIG. 6 is a schematic representation of data on a perpendicular magnetic recording medium.
FIG. 7 is a flow chart showing the details of a preferred logic for deriving the magnetization angle.

More specifically, in considering FIG. 6 it is shown that a magnetic transition indicating a positive "1" can be separated from a subsequent transition representing a minus "1" by, e.g., one or more zeroes (three zeroes separate the transitions shown in FIG. 6). As understood herein, most modulation codes allow 1, 2, 3, 4, or 5 zeroes at most in a row, between transitions. As also understood herein, the angle of magnetization varies with the distance between transitions and, hence, with the number of zeroes between transitions. Accordingly, the angle can be used as an estimate of how many zeroes are between transitions, which estimate in turn can be used to check for read back errors.

One way to derive the angle of magnetization is to determine the arctangent of the ratio of the Hilbert transformation of the perpendicular read signal to the perpendicular read signal. A more preferred way is shown in FIG. 7. Starting at block 64, the magnetic (perpendicular) signal is sent to the main Hilbert transform filter 16 discussed above, where, at block 66, it is transformed such that a transformed signal is generated and combined with the original signal. An envelope "m" can then be determined as the square root of the sum of the squares of the transformed signal and the original signal, i.e., as the square root of the sum of the squares of the real and imaginary parts of the complex analytic signal Moving to block 68, a logarithm (preferably to the base "e") of the absolute value of the envelope is determined by the logarithm generator 27. In one particularly preferred embodiment, the signal is passed through the differentiator 28 at block 70, so that the taking of a logarithm of a value near zero can be avoided. Then, the logarithm (or its derivative) is passed through the Hilbert transform filter 29 at block 72. The output of the Hilbert transform filter 29 is obtained at block 74, with the output representing the angle of magnetization being sought (or a derivative thereof).

It is to be understood that the present invention can be implemented in analog or digital hardware, and that the logic herein may be represented as computer software.

Figure 8:
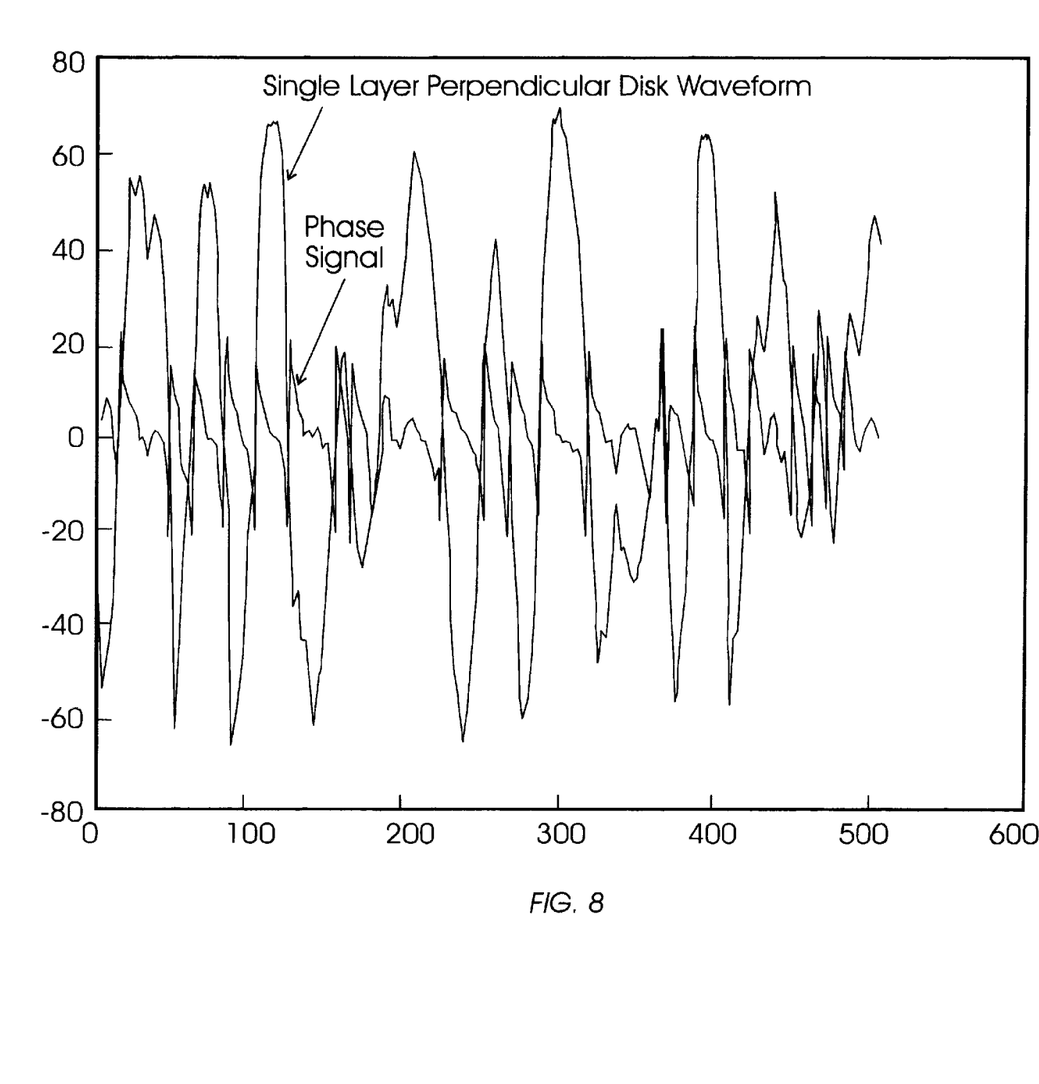
FIG. 8 is an amplitude versus time graph showing the phase signal superimposed on the single layer perpendicular disk signal.
Figure 9:
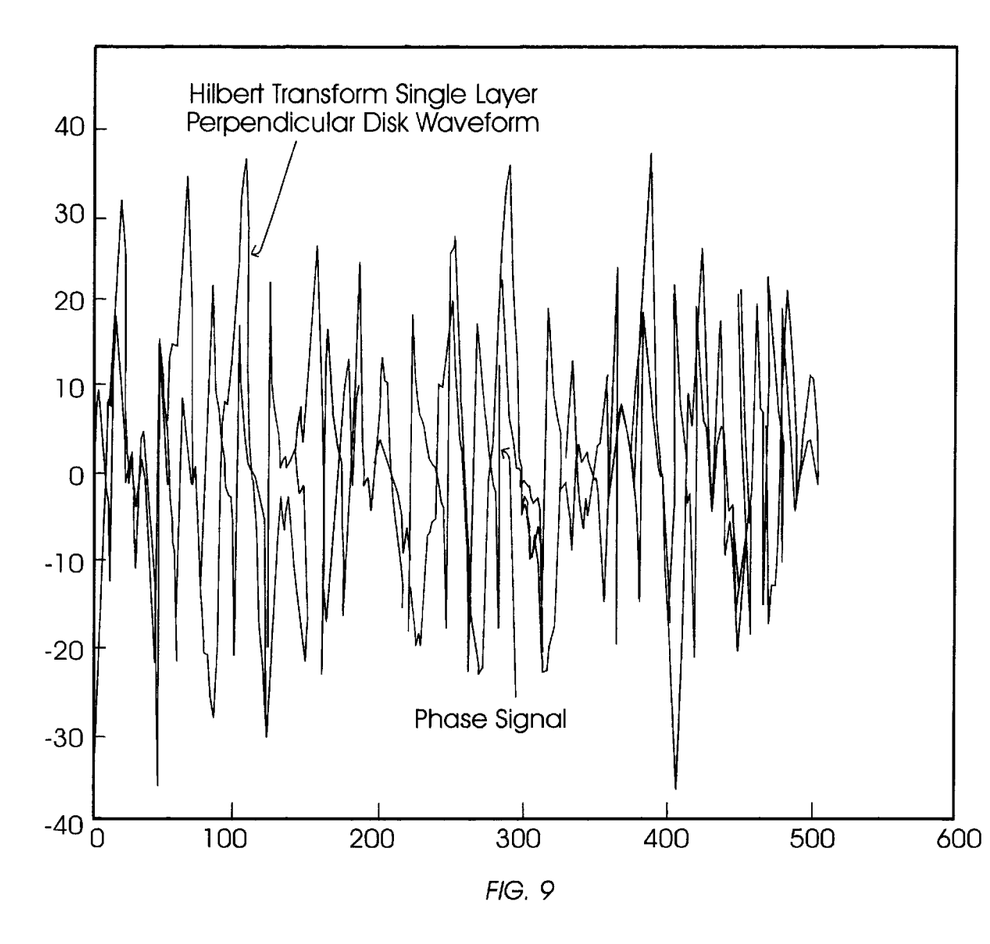
FIG. 9 is an amplitude versus time graph showing the phase signal superimposed on the Hilbert transform of the single layer perpendicular disk signal.
Figure 10:
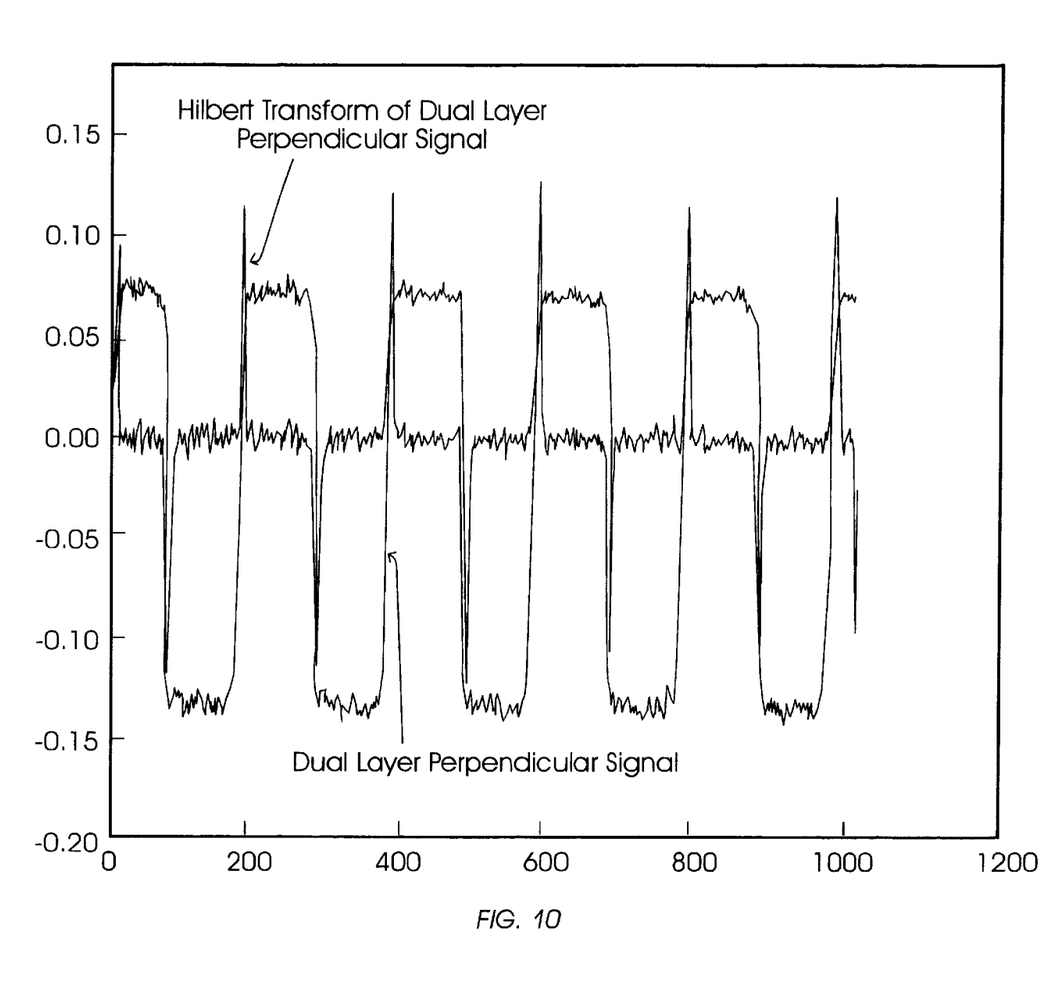
FIG. 10 is an amplitude versus time graph showing a dual layer perpendicular signal superimposed on the Hilbert transform of the dual layer perpendicular signal.
Figure 11:
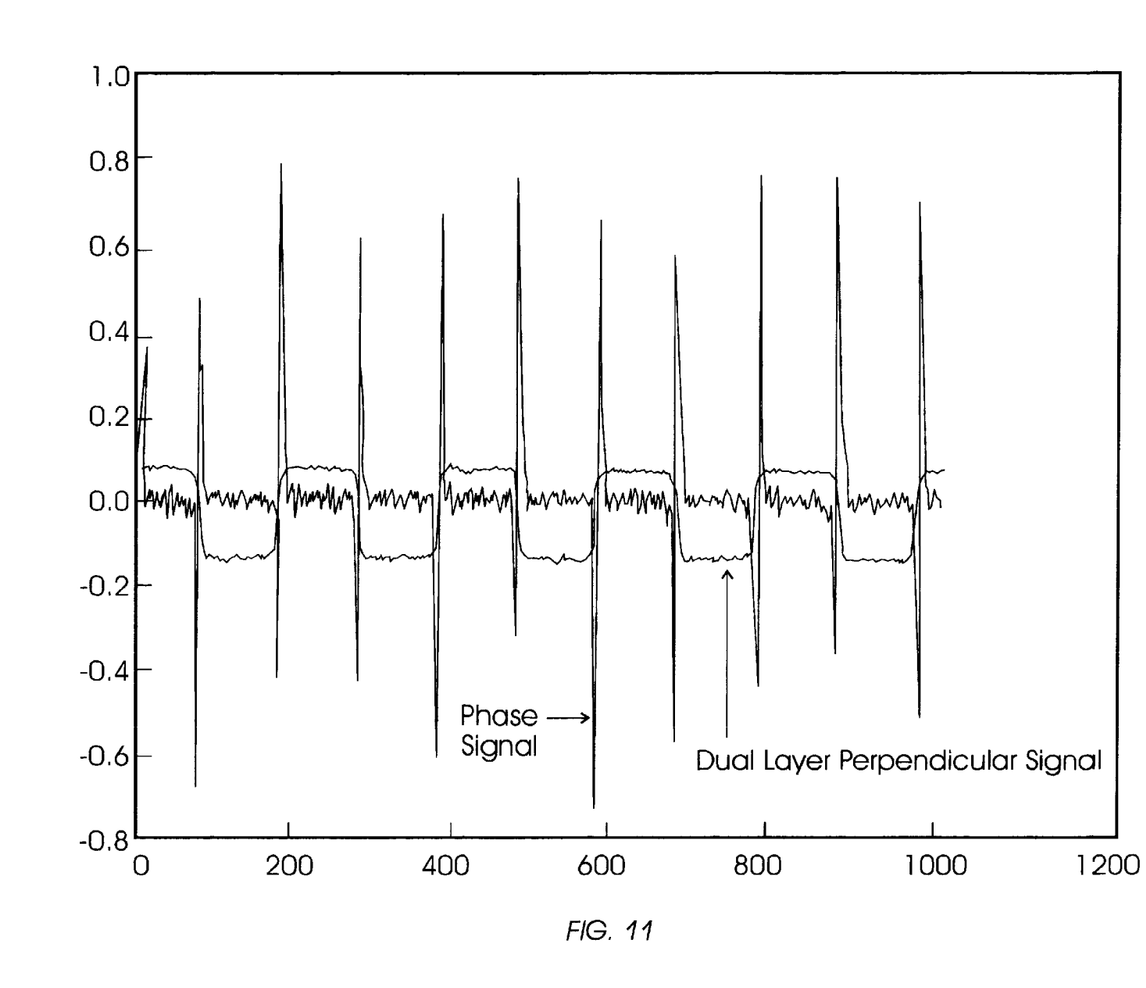
FIG. 11 is an amplitude versus time graph showing a dual layer perpendicular signal superimposed on the phase signal.

FIG. 8 is provided to show the relationship between the phase signal and the non-transformed perpendicular signal S(t) from a single layer disk. As shown, the phase signal frames the zero crossings of the non-transformed perpendicular signal, with the phase signal peaks being aligned with the single layer perpendicular signal zero-crossings. FIG. 9 shows the relationship between the phase signal and the Hilbert-transformed longitudinal signal S(t) from a single layer disk, wherein the peaks of the phase signal are synchronized (aligned) with the peaks of the Hilbert-transformed signal. While FIGS. 8 and 9 are actual graphs of signals from a single layer disk, the present invention applies equally to dual-layered disks. For instance, FIGS. 10 and 11 show dual layer disk signals superimposed on their Hilbert transforms and phase signals, respectively. In FIG. 10, the phase signal peaks and dual layer perpendicular signal transitions are aligned, while in FIG. 11 the Hilbert transform of the dual layer perpendicular signal has peaks at dual layer signal transitions.

While the particular PERPENDICULAR SIGNAL EQUALIZATION AND TIMING RECOVERY USING HILBERT TRANSFORM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act".

We claim:

1. A processing device for executing a method comprising:
   determining a magnetization angle or the rate of change thereof from a complex analytic signal established by combining a Hilbert transformation of a magnetic recording read signal with the read signal, wherein the method executed by the device includes:
   determining an envelope based on the read signal and a Hilbert transformation of the read signal; and
   determining a logarithm of the envelope.

2. The device of claim 1, wherein the method executed by the device includes:
   processing the logarithm or a derivative thereof through a Hilbert transform to render an output, the output representing the angle of magnetization.

3. The device of claim 2, wherein the method executed by the device includes correlating the angle of magnetization to a distance between magnetic transitions on the medium.

4. A method for determining an angle of magnetization on a perpendicular recording medium, comprising the acts of:
   receiving a signal from the medium;
   deriving a Hilbert transform of the signal;
   combining the Hilbert transform of the signal with the signal to render a complex analytic signal; and
   deriving a Hilbert transform signal using the complex analytic signal, the arctangent of the ratio of the Hilbert transform signal and complex analytic signal representing the angle of magnetization.

5. The method of claim 4, further comprising:
   using the angle of magnetization as an indication of a distance between magnetic transitions.

6. The method of claim 4, further comprising:
   deriving an envelope from the complex analytic signal;
   determining a logarithm of the envelope, prior to the act of deriving a Hilbert transform signal, the Hilbert transform signal being a Hilbert transformation of the logarithm or a derivative thereof.

7. A method for determining an angle of magnetization on a perpendicular recording medium, comprising the acts of:
   receiving a signal from the medium;
   deriving a Hilbert transform of the signal;
   using the Hilbert signal to derive the angle of magnetization;
   combining the Hilbert transform of the signal with the signal to render a complex analytic signal;
   deriving a Hilbert transform signal; and
   using the complex analytic signal, deriving a phase signal by arctangents of ratio of complex analytic signal components.

8. The method of claim 7, further comprising:
   deriving an envelope from the complex analytic signal;
   determining a logarithm of the envelope, prior to the act of deriving a Hilbert transform signal, the Hilbert transform signal being a Hilbert transformation of the logarithm or a derivative thereof.

* * * * *